United States Patent [19]

Rieppel et al.

[11] 4,201,902
[45] May 6, 1980

[54] ELECTRODE FOR AIR-CARBON ARC CUTTING AND GOUGING

[75] Inventors: Perry J. Rieppel, Worthington; Raymond A. Sadauskas, Columbus, both of Ohio

[73] Assignee: Arcair Company, Lancaster, Ohio

[21] Appl. No.: 5,650

[22] Filed: Jan. 22, 1979

Related U.S. Application Data

[62] Division of Ser. No. 848,816, Nov. 9, 1977, abandoned.

[51] Int. Cl.² ............................................. B23K 9/23
[52] U.S. Cl. .................................. 219/69 M; 219/68; 219/70; 219/72; 219/145.1
[58] Field of Search .................. 219/68, 69 M, 70, 72, 219/145.1, 145.23

[56] References Cited

U.S. PATENT DOCUMENTS

| 2,706,236 | 4/1955 | Stepath | 219/15 |
| 2,989,617 | 6/1961 | Stepath | 219/69 |
| 3,030,544 | 4/1962 | Zamboldi | 313/355 |
| 3,131,290 | 4/1964 | Stepath | 219/130 |
| 3,633,063 | 1/1972 | Ando | 219/145 |
| 3,796,853 | 3/1974 | Matsuo | 219/145 |

FOREIGN PATENT DOCUMENTS 45-21585 10/1970 Japan.

Primary Examiner—Richard R. Kucia
Attorney, Agent, or Firm—James C. Simmons; Barry Moyerman; E. Eugene Innis

[57] ABSTRACT

An aluminum coated carbon-graphite electrode for use in the air-carbon arc cutting and gouging process. Uniformly coating the electrode with commercially pure aluminum results in a lower operating noise level when the electrode is in use, a cleaner and safer work environment for the user and better performance than conventional electrodes. A further feature of the invention resides in lowering the operating air pressure in the torch when using the new electrodes to further reduce the operating noise level.

2 Claims, 4 Drawing Figures

ELECTRODE FOR AIR-CARBON ARC CUTTING AND GOUGING

This is a division of application Ser. No. 848,816, filed Nov. 9, 1977.

BACKGROUND OF THE INVENTION

1. Field of the Invention

This invention pertains to electrodes for use in the air-carbon arc cutting and gouging process used in industry for cutting, cleaning, or preparing metals for subsequent fabrication operations. In the hands of a skilled operator, a ferrous material, e.g. steel plate, can be provided with a groove which can subsequently be filled with a weld metal deposit to effect a repair or facilitate a subsequent fabrication operation.

2. Description of the Prior Art

The air-carbon arc cutting and gouging process was first described in U.S. Pat. No. 2,706,236. According to the process as now practiced, a carbon-graphite electrode, normally having a copper coating, is positioned so that an arc can be struck between the electrode and a workpiece. At the same time the arc is initiated, compressed air is caused to flow down one side of the electrode to forcibly remove (blast away) molten metal produced by the effect of the electric arc.

Electrodes suitable for use in the air-carbon arc cutting and gouging process are discussed in detail in U.S. Pat. Nos. 3,303,544; 3,131,290; 3,633,063; and 3,796,853. In all of the prior patents the conventional coating on the electrode is shown to be a thin copper layer. The copper layer is included to increase the conductivity along the length of the electrode and prevent errosion and oxidation of the electrode. The conventional method for applying the coating is by electroplating as is disclosed in U.S. Pat. No. 3,796,853.

Attempts have been made to improve the coatings by providing a multi-layered coating. One such coating is disclosed in Japanese Pat. No. 45-21585 wherein patentee discloses a carbon-graphite electrode having a first coating which is 0.05 millimeters of copper over which is placed a coating of 0.05 millimeters of aluminum. The purpose for the aluminum coating was to prevent deterioration of the copper in aqueous environments.

Conventional air-carbon arc cutting and gouging electrodes are generally produced by electroplating copper on the carbon-graphite electrode blank or substrate. These coatings are porous thus promoting adsorption of moisture from the air as noted in regard to the aluminum coated electrodes set out above. When the electrode is used, the copper-coated electrodes produce fumes of copper thus creating deleterious working conditions for the operator.

Lastly, almost all of the air-carbon arc copper coated electrodes operate at a noise level of between 120 and 125 dbA in normal use. This operation noise level exceeds current safe standards for operators using the air-carbon arc cutting and gouging process.

SUMMARY OF THE INVENTION

In order to avoid some of the problems inherent in prior art metal coated carbon graphite electrodes used in the air-carbon arc cutting and gouging process, it has been discovered that if the carbon graphite electrode is covered by a uniform layer of commercially pure aluminum placed on the blank by a vapor deposition technique, a superior electrode results. The coating should be between 0.002 and 0.025" uniform in thickness to ±0.001". An aluminum coating of this type solves the problem of deleterious dusts or fumes and reduces the operating noise level of the air-carbon arc cutting and gouging process by 3 to 5 dbA from the level produced by conventional copper-coated electrodes. Further reductions in the operating noise level of the process can be achieved by reducing the inlet air pressure at the electrode holder and hence the velocity of air striking the arc in the gouging area when using the new electrode.

Lastly, the aluminum coating applied by a vacuum vapor deposition technique produces a solid metal layer on the electrode which is impervious to moisture from the air, thus, increasing the shelf life of the electrode and eliminating some of the safety problems inherent in prior art electrodes.

Another aspect of the present invention resides in the discovery that an electrode spray-coated with aluminum shows an improvement of 2 to 3 dbA in operating noise level over that of a conventional copper coated electrode. The conductivity of this type coating is good and will result in a satisfactory albeit slightly porous coating on the electrode. However, this is considered to be an improvement upon the conventional copper coated electrodes.

Therefore, it is the primary object of this invention to provide an improved air-carbon arc cutting and gouging electrode.

It is another object of the present invention to provide an aluminum coated carbon-graphite electrode.

It is yet another object of the present invention to provide a carbon graphite electrode having thereon a uniform vapor deposited coating of commercially pure aluminum.

It is still a further object of the present invention to provide an electrode suitable for reducing the operating noise level of the conventional air-carbon arc cutting and gouging process.

It is another object of the present invention to provide a method for reducing the operating noise level of the conventional air-carbon arc cutting and gouging process.

DETAILED DESCRIPTION OF THE PREFERRED EMBODIMENT

Figure 1:
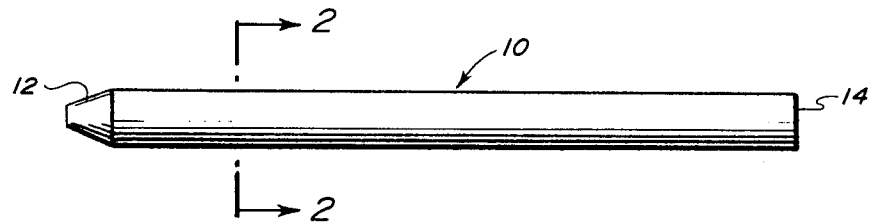
FIG. 1 is a plan view of an electrode according to the present invention.
Figure 2:
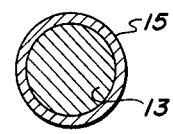
FIG. 2 is a section taken along the lines 2—2 of FIG. 1.

FIG. 1 of the drawing shows an electrode 10 having a pointed or front end 12 and a grip end 14. The electrode 10 has a core 13 of a carbon graphite material having the following nominal composition:

| Constituent | % by Weight |
| --- | --- |
| Coke | 67.6 |
| Artificial Graphite | 2.4 |
| Carbon Black | 4.9 |
| Natural Graphite | 4.9 |

| -continued | |
|---|---|
| Constituent | % by Weight |
| Iron Oxide | .6 |
| Coal Tar Pitch | 10.5 |
| Oleic Acid | 1.1 |

The core 13 is extruded or pressed to a green shape and sintered in a conventional furnace at a temperature of approximately 1900° F. After the sintering operation, the electrode surface is cleaned and a coating 15 is placed over the entire core 13. The preferred electrode coating is commercially pure aluminum (99%+Al).

Preferably, the coating is placed on the substrate or core 13 by a vapor deposition technique in a vacuum of between $10^{-5}$ to $10^{-6}$ (torr). Vapor deposition techniques are well-known, and the precise method of applying the coating does not form a part of this invention. However, the coating must be applied by a technique that will yield a coating uniform in thickness, impervious to moisture and electrically conductive. The preferred coating thickness is between 0.002 and 0.025″ and is uniform along the entire length of the substrate 13 to ±0.001″.

The commercially pure aluminum replaces copper plating on the surface of the air-carbon arc electrode 10. The aluminum coated electrodes are found to be equal to the copper coated electrodes in metal removal, overall operation, surface finish, appearance and all of the other features which the customer normally associates with copper coated electrodes. Aluminum is a less expensive coating material than copper, and most important, the aluminum coating reduces the toxicity of the dust produced by the air-carbon air cutting and gouging process.

A second important result obtained with the aluminum coating placed on the substrate, as set out above, is that the coating is impervious to moisture thus allowing aluminum coated electrodes to be stored at a job site or in a shop. The impervious coating minimizes the explosion risk common with conventional electrodes stored in environments where moisture pick-up can occur.

Conventional copper coated electrodes having a coating that was applied to a substrate not properly dried have in the past had the coating spall off during actual cutting and gouging after a few days on the shelf. Such electrodes have shown a tendency to absorb additional moisture and have on occasion exploded during use. Explosion occurs because of the retained moisture being rapidly converted to steam in the presence of the arc.

Aluminum is lighter, therefore it has greater volume per pound and more electrodes can be coated per pound of aluminum than with an equal amount of copper. Aluminum being approximately three times lighter than copper, contains approximately three times the volume of copper per pound. Aluminum has approximately 60% of the electrical conductivity of copper. As an example, a 0.007″ coating of aluminum on a ½″ diameter carbon graphite rod is equivalent to a copper coating 0.0045″ in thickness. A one-half inch diameter by twelve inch long carbon electrode would require 0.018 cubic inches of copper for the coating whereas the same electrode requires 0.126 cubic inches of aluminum. This volume of copper weighs approximately as much as 0.243 cubic inches of aluminum. Therefore, the equivalent weight of aluminum would be more than adequate in volume to coat twice as many electrodes with a coating 0.007″ thick. With aluminum costing approximately one-half as much as copper, the cost of aluminum per electrode would be one-fourth that of copper thus producing a more economical electrode.

Figure 3:
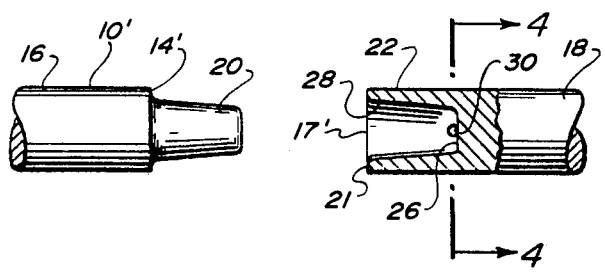
FIG. 3 is a fragmentary plan view showing a method of providing successive electrode joining for electrodes of the present invention.
Figure 4:
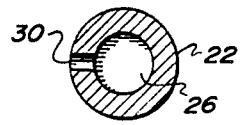
FIG. 4 is a section taken along the line 4—4 of FIG. 3.

FIG. 3 discloses a conventional plug and socket connection used to join successive electrodes which normally are used in automatic air-carbon arc cutting and gouging torches. One type of electrode feed device employing such electrodes is shown in U.S. Pat. No. 2,989,617. Each electrode 10' has at its trailing end 14' a plug terminal 20 which can be fitted to the female socket terminal 22 formed in the fornt end 17' of the electrode 10' as shown in the drawing. The plug 20 is tapered from end 14' toward its end 24 as shown in the drawing. Female socket terminal 22 has a complimentary tapered wall 28. Socket terminal 22 has an end wall 26 which cooperates with side wall 28 for frictionally receiving plug 20, the side wall 28 being tapered outwardly toward the end 21 of terminal 22.

In use, successive lengths of electrode can be joined as the preceding electrode is consumed. At the time the joint comes into contact with the heat of the electric arc, gases generated by heat of the arc escape through vent hole 30 until the terminal is completely consumed, thereby preventing buildup of pressure at the electrode joint. The diameter of vent hole 30 is nominally 1/16 of an inch.

As set out above, the aluminum coating on the electrode is preferably achieved by vacuum vapor deposition. However, the coating could be applied by plasma spraying, die casting, electroplating, rolled-on powder, ion plating, cathode sputtering or other means that would produce the impervious aluminum coating of controlled thickness. The vacuum vapor deposition process achieves an aluminum coated electrode that contains essentially no water in the body of the electrode and produces a coating that is impervious to water vapor thus preventing absorption of water into the body (carbon-graphite substrate) during storage prior to use.

The aluminum coated electrode greatly reduces the toxicity level of dust produced when the electrode is being used. According to the American Conference of Government and Industrial Hygienists as set out in their paper entitled "Threshold Limit Values for Chemical Substances in Work Room Air Adapted by ACGIH for 1974", the following Threshold Limit Values (TLV) are preferred:

1. For copper fume, dusts and mists-TLV 1 mg/m$^3$;
2. Alundum (Al$_2$O$_3$) TLV E (Nuisance Particulate-General Limit of 10 mg/m$^3$.

From the foregoing it is obvious that aluminum is a preferred material because when the electrode coating is consumed, it is converted to Al$_2$O$_3$ which is inherently less dangerous than copper fume or the product coming off the copper coated electrode during use.

By and large, the greatest benefit achieved from the aluminum coated electrode is the reduction in operating noise level as the electrode is being used. Conventional copper coated electrodes normally produce a noise level of from 120 to 125 dbA in normal use. This exceeds the safe range for an operator. In other words, at these noise levels an operator over a prolonged period of time can suffer hearing loss.

A series of experiments were conducted in a specially built anechoic chamber so that comparative tests between copper coated and aluminum coated electrodes could be run.

The tests were run using a model N-5 automatic air-carbon arc cutting and gouging torch, manufactured by the Arcair Company of Lancaster, Ohio, in order to remove any operator variability from the tests. Tests were run using an electrode stick-out of three inches. The torch was connected to a TEKTRAN model LSC 1000 power supply also manufactured and sold by the Arcair Company. Sound data was taken with a Scott model 452 sound meter with a standard ceramic microphone located 20" from the arc on a line perpendicular to the direction of arc travel.

Results of a first series of tests comparing various diameter electrodes is set out in Table I.

TABLE I

| Electrode | | | No. of Samples | Power Supply | | Noise dbA (Ave.) |
|---|---|---|---|---|---|---|
| Diameter | Type | Coating | | Volts | Amps | |
| ¼" | D.C. | Al | 3 | 40 | 570 | 122.6 |
| ¼" | D.C. | Cu | 2 | 40 | 570 | 123.7 |
| ⅜" | D.C. | Al | 2 | 40 | 1200 | 122.0 |
| ⅜" | D.C. | Cu | 1 | 40 | 1200 | 123.5 |
| ¼" | D.C. | Cu | 1 | 40 | 1000 | 123 |
| ¼" | D.C. | Cu | 1 | 40 | 1000 | 125 |
| ¼" | D.C. | Al | 1 | 40 | 1100 | 122 |
| ¼" | D.C. | Al | 1 | 40 | 1000 | 122 |
| ⅜" | D.C. | Cu | 1 | 40 | 1200 | 124 |
| ⅜" | D.C. | Al | 1 | 40 | 1200 | 122 |

In the foregoing table, the D.C. electrode means an electrode operated under direct current. Generally, the carbongraphite electrode contains no additives. The process can be run under alternating current (A.C.), however, in this event, the electrodes must contain arc stabilizing compounds.

The tests of Table I were run with the air pressure in the torch head being 100 psi. The reduction of operating noise measured for the aluminum coated electrodes in these tests was noted but is not deemed significant.

Upon further experimentation, it was learned that if the air pressure was reduced, significant reduction in operating noise can be achieved. Set out in Table II is a series of tests which were run with varying air pressure in the torch.

TABLE II

| Electrode | | | Power Supply | | Air Supply (psi) | Ave. Noise dbA |
|---|---|---|---|---|---|---|
| Dia | Type | Coating[1] | Volts | Amps | | |
| 5/16" | D.C. | Cu | 40 | 450 | 60 | 117–118 |
| 5/16" | D.C. | Al | 40 | 450 | 60 | 114–116 |
| 5/16" | D.C. | Cu | 40 | 450 | 40 | 113–114 |
| 5/16" | D.C. | Al | 40 | 450 | 40 | 111–113 |
| 178" | D.C. | Cu | 40 | 750 | 60 | 116–118 |
| ¼" | D.C. | Al | 40 | 750 | 60 | 115–117 |
| ¼" | D.C. | Cu | 40 | 750 | 40 | 114–116 |
| ¼" | D.C. | Al | 40 | 750 | 40 | 112–113 |
| ⅜" | D.C. | Cu | 40 | 1000 | 60 | 116–118 |
| ⅜" | D.C. | Al | 40 | 1000 | 60 | 115–117 |
| ⅜" | D.C. | Cu | 40 | 1000 | 40 | 113–115 |
| ⅜" | D.C. | Al | 40 | 1000 | 40 | 112–114 |

Note*
[1]Dia - Diameter
Type - D.C. Conventional Direct Current Electrode
Coating - Cu - Copper Al - Aluminum The results set forth in Table II show that when the air supply pressure is reduced thus reducing the velocity of the air striking the arc in the gouging area, there is a further significant drop in the operating noise level when using electrodes according to the invention. It is true that under the same conditions there is a drop in operating noise level of the copper coated electrodes, however, the drop noted when using the aluminum coated electrode is even greater.

Electrodes, coated by a vapor deposition technique according to the present invention, show a longer shelf life because the coating is impervious to moisture.

It has also been discovered that electrodes can be given an aluminum coating by a spray coating technique (metallizing gun). This type of coating is satisfactory where moisture adsorption is not a problem but noise reduction is desirable. Coatings of flame sprayed aluminum can be applied uniformly to within ±0.001" and result in a decrease of 2–3 dbA in noise pressure at the operator's ear. Table III sets forth a series of experiments utilized to verify this phenomena.

TABLE III

Gouging Noise Output of Aluminum Sprayed
Electrodes Versus Copper Electro-Plated Electrodes

| Electrode *Diameter & Coating | Amps | Volts | Noise Level |
|---|---|---|---|
| ⅜" Copper Electro-Plated | 600 | 40 | 118–120 |
| ⅜" Aluminum Sprayed | 600 | 40 | 115–117 |
| 5/16" Copper Electro-Plated | 450 | 40 | 117–118 |
| 5/16" Aluminum Sprayed | 450 | 40 | 115–117 |
| ¼" Copper Electro-Plated | 400 | 40 | 117–118 |
| ¼" Aluminum Sprayed | 400 | 40 | 115–117 |
| 3/16" Copper Electro-Plated | 250 | 40 | 113–115 |
| 3/16" Aluminum Sprayed | 250 | 40 | 112–114 |
| 5/32" Copper Electro-Plated | 150 | 40 | 114–116 |
| 5/32" Aluminum Sprayed | 150 | 40 | 111–113 |

*Substrate Conventional Direct Current Electrode

From the foregoing it is apparent that a conventional direct current electrode spray-coated with aluminum will result in an electrode that in use lowers noise pressure in the operator's ear. The decrease over the noise produced by the conventional copper coated electrode is significant because the magnitude of the scale is logrithmic.

Aluminum coated electrodes, according to the present invention, show overall improved performance characteristics because of the uniformity of the coating. It is well-known among operators that the uniformity of the coating on the electrode can greatly influence the operation of the air-carbon arc cutting and gouging process. If the coating is 0.002" thinner than needed in any area of the electrode, it will melt back rapidly and further than desired. This is especially true in the area of the joint when continuous jointed electrodes are being consumed. If the coating is too thin, the joint will become overheated during the final consumption of the leading electrode. The stub of the electrode may drop off thus wasting carbon, and the coating on the succeeding electrode will become overheated and melt back with the following results:

1. The electrode will become white hot and carbon will sublime more rapidly over a longer length of the electrode than is desired.

2. The electrode will become pointed instead of remaining close to the normal diameter at the operating end thus altering the shape of the gouge making it generally narrower than desired and of irregular shape.

3. The noise level of the process will go up, e.g. on a one-half inch diameter electrode, the noise level will increase between 4 and 7 dbA.

4. Electrode consumption will increase 20 to 50% thus reducing efficiency.

Experiments have shown that thicker coatings on a given diameter electrode result in a coating that stays on the electrode. Electrodes with thick coatings do not heat up to red heat more than one inch from the working (arc) end. Thus cuts down the heat radiated to the worker's hands and body thus improving worker comfort. A preferred range of heavy coating is from 0.006" on a ¼" diameter rod to about 0.025" on a ⅝" diameter rod. For thin coatings, a preferred maximum thickness is 0.012" and for thick coatings, 0.020".

Aluminum coated carbon graphite electrodes according to the present invention provide the following distinct advantages:

1. Low toxicity dusts or fumes.
2. Eliminate water adsorption with a completely vapor deposition coated electrode.
3. Lower operating noise level (3–5 dbA).
4. Longer shelf life.
5. Lower cost electrode coatings without sacrificing metal removal rates for the overall electrode.
6. Better overall performance because of the uniform thickness of the coating.

Having thus described my invention, what I desire to be secured by Letters Patent of the United States, is set forth in the appended claims.

We claim:

1. A method of lowering the operating noise level at least 20 dbA of the conventional air-carbon arc cutting and gouging process by the steps of:
   replacing the conventional copper coated carbon-graphite electrode with a carbon-graphite electrode having a 0.002" to 0.012" of commercially pure aluminum as a coating uniform in thickness to ±0.001"; and
   operating said method at a maximum delivered air pressure as measured in the torch head of 60 psi.

2. A method according to claim 1 wherein said delivered air pressure is between 40 and 60 psi.

* * * * *